US009439131B2

(12) United States Patent
Rudolph et al.

(10) Patent No.: US 9,439,131 B2
(45) Date of Patent: Sep. 6, 2016

(54) DETECTING AND DISABLING ROGUE ACCESS POINTS IN A NETWORK

(71) Applicant: Adtran, Inc., Huntsville, AL (US)

(72) Inventors: Mark C. Rudolph, Madison, AL (US); Timothy James Schlichter, Huntsville, AL (US); Thomas F. Guevin, Nashua, NH (US)

(73) Assignee: Adtran, Inc., Huntsville, AL (US)

( * ) Notice: Subject to any disclaimer, the term of this patent is extended or adjusted under 35 U.S.C. 154(b) by 59 days.

(21) Appl. No.: 14/276,332

(22) Filed: May 13, 2014

(65) Prior Publication Data

US 2015/0334632 A1  Nov. 19, 2015

(51) Int. Cl.
| | |
|---|---|
| *G06F 11/00* | (2006.01) |
| *H04W 48/02* | (2009.01) |
| *H04W 8/20* | (2009.01) |
| *H04W 8/24* | (2009.01) |
| *H04W 12/12* | (2009.01) |
| *H04L 29/06* | (2006.01) |
| *H04W 84/12* | (2009.01) |

(52) U.S. Cl.
CPC ............ *H04W 48/02* (2013.01); *H04W 8/20* (2013.01); *H04W 8/24* (2013.01); *H04W 12/12* (2013.01); *H04L 63/0236* (2013.01); *H04L 63/1416* (2013.01); *H04L 63/162* (2013.01); *H04W 84/12* (2013.01)

(58) Field of Classification Search
CPC ........................................................ G06F 21/50
USPC ...................................... 726/22, 12; 713/187
See application file for complete search history.

(56) References Cited

U.S. PATENT DOCUMENTS

| | | | | |
|---|---|---|---|---|
| 7,570,625 | B1 * | 8/2009 | Ocepek | H04W 12/12 370/310 |
| 8,782,740 | B1 * | 7/2014 | Sarra | G06F 21/50 380/250 |
| 2006/0193258 | A1 * | 8/2006 | Ballai | H04L 63/10 370/230 |
| 2006/0209700 | A1 | 9/2006 | Sundar et al. | |
| 2009/0067403 | A1 * | 3/2009 | Chan | H04W 16/10 370/343 |
| 2011/0110293 | A1 | 5/2011 | Hart et al. | |
| 2014/0334317 | A1 * | 11/2014 | Atreya | H04L 63/14 370/252 |

FOREIGN PATENT DOCUMENTS

| | | |
|---|---|---|
| KR | 20040038168 A | 5/2004 |
| WO | 2012137646 A1 | 10/2012 |

OTHER PUBLICATIONS

International Search Report and Written Opinion—PCT/US2015/030056—ISA/EPO—Aug. 24, 2015.

\* cited by examiner

*Primary Examiner* — Christopher Brown
(74) *Attorney, Agent, or Firm* — Smith Tempel Blaha LLC; Michael J. Tempel

(57) ABSTRACT

A rogue access point in a wireless local-area network can be disabled by an authorized access point wirelessly transmitting a layer-2 broadcast packet. If a rogue access point receives this broadcast packet, it will forward a copy to the switch to which it is connected. The switch then determines whether the port on which the copy of the broadcast packet is received is associated an authorized access point port. If the switch determines the port is not an authorized access point port, the switch shuts down the port.

15 Claims, 5 Drawing Sheets

DETECTING AND DISABLING ROGUE ACCESS POINTS IN A NETWORK

BACKGROUND

A wireless local-area network (WLAN) uses radio communication to connect client devices, such as laptop computers, tablet computers, smartphones, etc., to other devices and to the Internet or other networks. Devices and network infrastructure that are commonly referred to as WLAN-enabled or "Wi-Fi"—enabled devices comply with the IEEE 802.11 family of standards. The term "Wi-Fi" has been promulgated by the Wi-Fi Alliance to refer to WLAN products that are based on the IEEE 802.11 standards.

Devices wirelessly connect to the WLAN via network devices known as access points (APs). An AP commonly includes a WLAN radio transceiver, an Ethernet adapter, and an Ethernet cable connector. An AP can be connected with a wired network using an Ethernet cable between the AP and an Ethernet switch in the wired network. A device within radio proximity or range of the AP, commonly about 20 meters, can establish radio communication with the AP and, upon satisfying certain conditions, can communicate with the wired network via the AP.

In a secure network, such as a network operated by a business, each AP is configured to require users to authenticate themselves as a condition for enabling access to the network. Typically, an AP prompts a user to enter a key or password on the client device to be wirelessly connected. The AP compares the password and, if the password is correct, authenticates the device and associates the device with the AP. The device remains in an authenticated and associated state and is thus enabled to access the network until such time as the device may be deauthenticated and dissociated from the AP.

The term "rogue AP" has been used to refer to an AP that has been installed in a secure network without authorization (e.g., authorization from a business's network administrator). For example, a person may attempt to connect an AP to a network for the purpose of attacking or "hacking" the network. It is also not uncommon for an employee without malicious intentions to bring an AP onto the business's premises and plug it into an Ethernet jack without authorization. Rogue APs pose a security threat because they are generally not configured to require users to authenticate themselves as a condition for enabling access to the network. Rather, a rogue AP is commonly configured to grant access to any and all devices within the radio proximity of the AP.

A goal of network administrators is to ensure that no rogue APs can access the network. One tactic that network administrators employ toward achieving this goal is to attempt to detect rogue APs and disable any that are detected. A common method for disabling rogue APs involves the network transmitting a multiplicity of deauthentication packets. Client devices are generally configured to respond to a deauthentication packet by dissociating from connection with the AP. One problem with this method is that it floods the radio spectrum and reduces the overall bandwidth of the medium, severely hampering data throughput for authorized users using authorized APs on the same radio frequency. Also, as standards evolve, it is anticipated that future standards will not support this method. It would be desirable to provide an improved method and system for detecting and disabling rogue APs.

SUMMARY

Embodiments of the invention relate to a system, method, and computer program product for disabling an unauthorized access point in a wireless local-area network. In an exemplary embodiment, a first access point wirelessly transmits a broadcast packet. If another access point receives this broadcast packet, it will forward a copy of the broadcast packet to the network switch to which it is connected (via a wired connection to a port of the switch). Thus, in the exemplary embodiment a network switch receives such a forwarded copy of the broadcast packet from a second access point. In response to receipt of the forwarded copy of the broadcast packet, the switch determines whether the port is an authorized access point port. If the switch determines the port is not an authorized access point port, the switch shuts down the port, thereby disabling the second access point from accessing the network.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
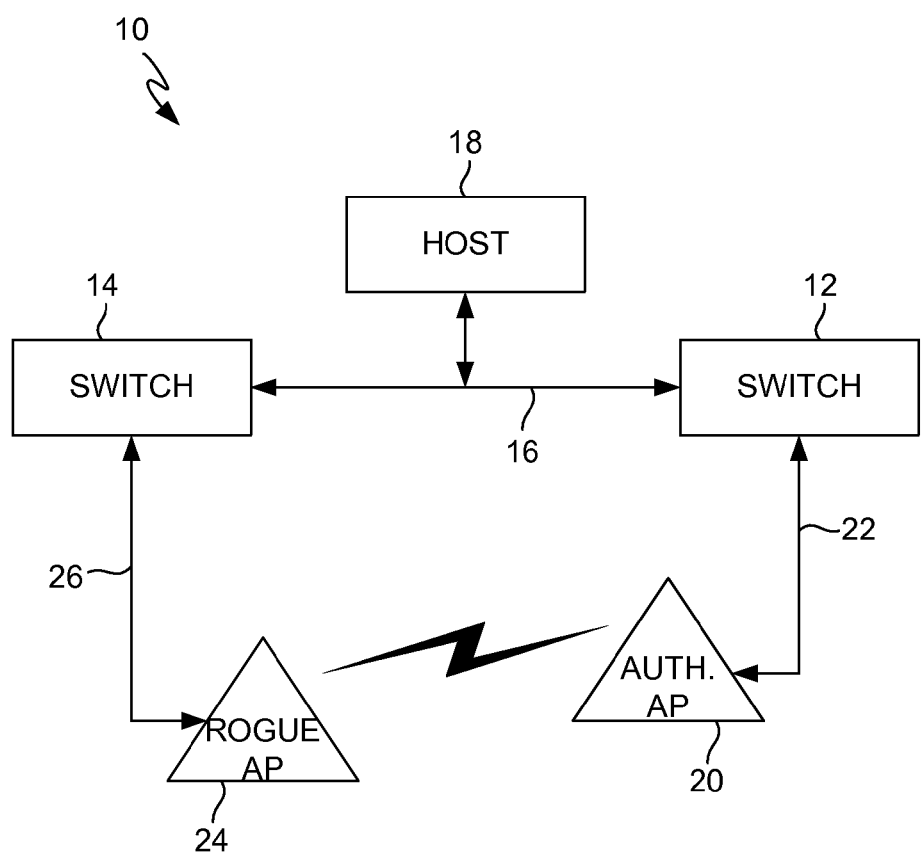
FIG. 1 is a block diagram of a system for detecting and disabling a rogue access point, in accordance with an exemplary embodiment of the invention.

As illustrated in FIG. 1, in an illustrative or exemplary embodiment of the invention, a data network or system 10 includes one or more network switches 12 and 14 and network links 16. System 10 can also include other nodes or elements of the type that are commonly included in computer networks, such as a host 18 (e.g., a server) as well as (not shown for purposes of clarity) bridges, routers, firewalls, etc. Although only one host 18 and two network switches 12 and 14 are shown, system 10 can include any number of such hosts, switches and other nodes or elements. It should also be noted that network links 16 can include any suitable wire or fiber-optic cabling or other media. The network represented by switches 12 and 14, communications links 16, host 18, etc., can have any suitable topology. Although in the exemplary embodiment system 10 operates in accordance with Ethernet principles, in other embodiments such a system can operate in accordance with any other suitable networking principles, protocols, standards, etc.

System 10 also includes a first access point (AP) 20 that operates in accordance with conventional wireless local-area network (WLAN) principles and as otherwise described below. First AP 20 is an authorized AP. As used herein, the term "authorized AP" means that the entity (not shown) that owns or exercises control over the network approves or authorizes the inclusion of first AP 20 in the network. A communication link 22, such as an Ethernet cable, connects AP 20 with switch 12 in a conventional manner First AP 20 is described in further detail below.

A second AP 24 is also connected to the network. Second AP 24 is a rogue AP. As used herein, the term "rogue AP" or "unauthorized AP" means that the entity that owns or exercises control over the network has not approved or authorized the inclusion of second AP 24 in the network. For example, it is contemplated that a person with malicious intentions may attempt to use second AP 24 to access the network without authorization. Such a person can, for example, connect second AP 24 with switch 12 using a communication link 26, such as an Ethernet cable. As described below, the system and method of the exemplary embodiment are directed to impeding such an unauthorized use of second AP 24 to attempt to access the network.

Figure 2:
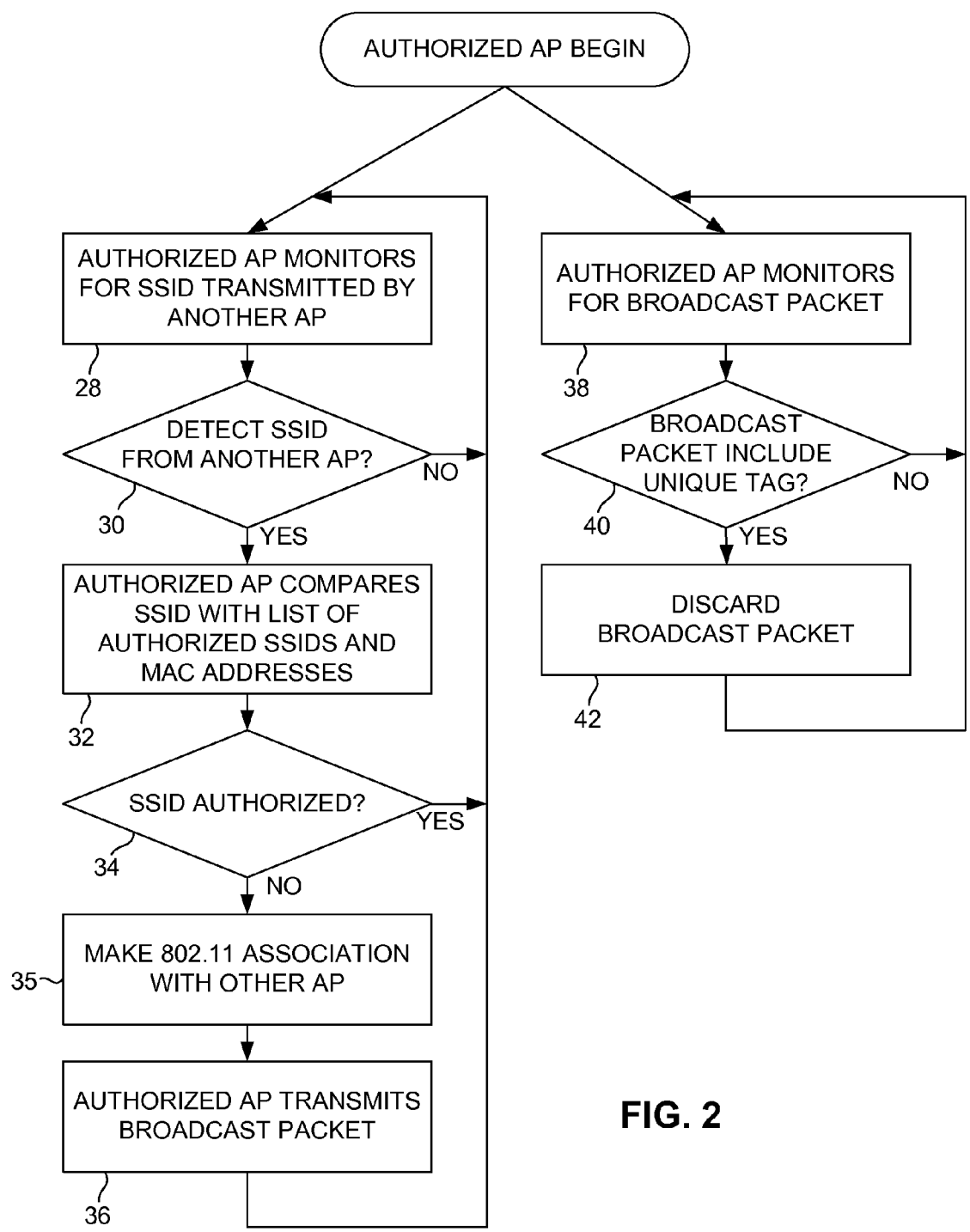
FIG. 2 is a flow diagram illustrating a method of operation of an access point in the system of FIG. 1, in accordance with the exemplary embodiment of the invention.

As illustrated in FIG. 2, an exemplary method relating to the operation of first AP 20 (FIG. 1) is represented by blocks 28-42. As indicated by blocks 28-36, first AP 20 is configured to detect network access by another AP. As indicated by block 28, first AP 20 monitors wireless communications for a beacon signal of the type that is characteristically transmitted by APs operating in accordance with the IEEE 802.11 family of standards. Such a beacon signal contains a service set identifier (SSID). As indicated by block 30, first AP 20 determines whether it detects such a beacon signal (and SSID). If first AP 20 does not detect such a beacon signal, then first AP continues to monitor for such a signal, as described above with regard to block 28, and also continues to operate in a conventional manner (not shown). If first AP 20 determines that it detects such a beacon signal (and SSID) transmitted by another AP, then first AP 20 compares that SSID as well as the other AP's MAC address against information representing a list of authorized APs, as indicated by block 32. The list comprises pairs or combinations of SSID and MAC address, where each SSID and MAC address combination represents an authorized AP. As indicated by block 34, first AP 20 determines whether the AP is authorized, i.e., whether the SSID and MAC address combination is included in the list. If first AP 20 determines that the AP is authorized, then first AP continues to monitor for such a signal, as described above with regard to block 28. If first AP 20 determines that the AP is not authorized, then first AP 20 makes an 802.11 association with the other AP and transmits a layer-2 broadcast packet, as indicated by blocks 35 and 36, respectively. The layer-2 broadcast packet can contain a unique tag that is used as described below. As well understood in the art, a layer-2 broadcast packet is a type of packet that is forwarded only by nodes within the network; nodes that are not in the network ignore such a packet.

Although in the exemplary embodiment first AP 20 transmits the above-referenced broadcast packet only in response to detecting a beacon signal (and SSID) transmitted by an unauthorized or rogue AP, in other embodiments such a first (authorized) AP can transmit such a broadcast packet at any other suitable time. For example, in other embodiments such a first AP can transmit such a broadcast packet periodically. Alternatively, for example, in other embodiments such a first AP can transmit such a broadcast packet in response to detecting a beacon signal regardless of whether the beacon signal contains an unauthorized SSID.

As indicated by blocks 38-42, first AP 20 is also configured to avoid being mis-identified as a rogue AP. As noted above, although only a single first (authorized) AP 20 is described with regard to the exemplary embodiment, the network can include other authorized APs that are configured in a manner identical to AP 20 and thus operate in the manner described above with regard to blocks 28-36. As indicated by block 38, first AP 20 monitors wireless communications for broadcast packets. As indicated by block 40, first AP 20 determines whether each broadcast packet it receives contains the above-described unique tag. The tag can have any suitable format that provides information that first AP 20 can identify as distinct from information conventionally included in broadcast packets. If first AP 20 determines that a broadcast packet it receives does not contain the unique tag, then first AP 20 continues to monitor for such broadcast packets, as described above with regard to block 38. Note that, as first AP 20 operates in a conventional manner in addition to the manner described herein, first AP would forward a broadcast packet not containing the unique tag to switch 12. Such conventional operation is not indicated in FIG. 2 for purposes of clarity. However, if first AP 20 determines that a broadcast packet it receives contains the unique tag, then first AP 20 discards that packet, as indicated by block 42. In the exemplary embodiment first AP 20 discards the packet because it would be undesirable for AP 20 to forward the packet to switch 12 for reasons described above. Nevertheless, in other embodiments such a first (authorized) AP can respond to such broadcast packets in any other suitable manner.

It should be understood that the method described above with regard to blocks 28-42 is not intended to represent the entirety of the operation of first AP 20. Rather, the method described above with regard to blocks 28-42 represents only those operational aspects that are most directly related to the exemplary embodiment of the invention. Other operational aspects of first AP 20, such as those that are conventional, are not described herein, as they are well understood by persons skilled in the art. Except as otherwise stated, first AP 20 operates not only in the manner described above but also in the manner of a conventional AP and thus can include any operational aspects or features commonly included in conventional APs.

Figure 3:
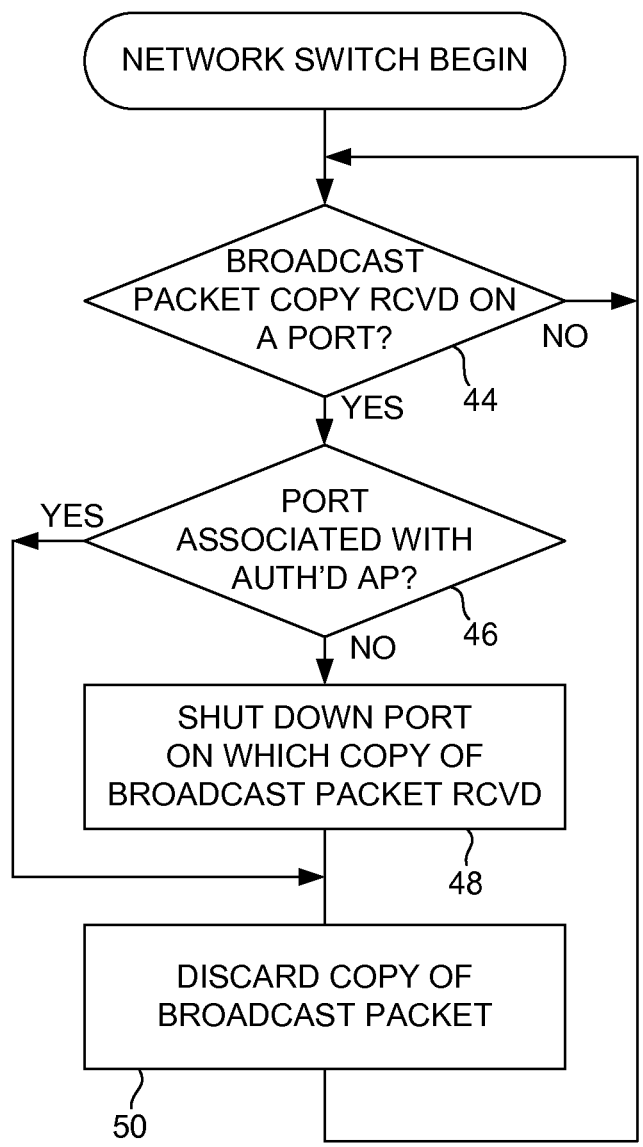
FIG. 3 is a flow diagram illustrating a method of operation of a network switch in the system of FIG. 1, in accordance with the exemplary embodiment of the invention.

As illustrated in FIG. 3, an exemplary method relating to the operation of network switches 12 and 14 (FIG. 1) is represented by blocks 44-50. Each of switches 12 and 14 is configured to disable network access by a rogue AP. The method is described with regard to switch 14 for purposes of clarity, but the method also applies to switch 12 and, in embodiments (not shown) having still further switches, applies to every such further switch. As indicated by block 44, switch 14 determines whether it receives (from an AP) a copy of a layer-2 broadcast packet of the type described above with regard to FIG. 2. If switch 14 does not receive such a broadcast packet, then switch 14 continues to monitor for such broadcast packets and also continues to operate in a conventional manner If switch 14 receives such a broadcast packet, then switch 14 determines whether the port on which it received the broadcast packet is an authorized AP port, as indicated by block 46. Switch 14 can determine whether the port is an authorized AP port by comparing information identifying the port against a list, as described in further detail below. The term "authorized AP port" means that the port can be expected to have an AP connected to it. In contrast, a port to which a rogue or unauthorized AP is connected is not an authorized AP port.

If switch 14 determines that the port on which the broadcast packet was received is not an authorized AP port, then switch 14 shuts down the port on which the broadcast packet was received, as indicated by block 48. Switch 14 then discards that broadcast packet, as indicated by block 50.

However, if switch 14 determines that the port on which the broadcast packet was received is an authorized AP, then switch 14 discards the broadcast packet and continues to monitor for broadcast packets and operate in a conventional manner.

Thus, for example, in an instance in which a person connects second AP 24 to a port of switch 14 without authorization, second AP 24 receives the broadcast packet from first AP 20 and forwards a copy of the broadcast packet to switch 14 (as second AP 24 inherently or conventionally would do with essentially any broadcast packet). In response to receiving (block 44) the copy of the broadcast packet, switch 14 determines (block 46) that the port on which the broadcast packet was received is not associated with an authorized AP. In response to this determination that the port on which the broadcast packet was received is not an authorized AP port, switch 14 shuts down that port, i.e., the port to which second AP 24 is connected. Shutting down the port disables second AP 24 from accessing the network via switch 14. It should be noted that although in this exemplary instance second AP 24 is connected to switch 14, the result would be the same if second AP 24 were connected to switch 12 or any other (not shown) switch in the network.

It should be understood that the method described above with regard to blocks 44-50 is not intended to represent the entirety of the operation of switches 12 and 14. Rather, the method described above with regard to blocks 44-50 represents only those operational aspects that are most directly related to the exemplary embodiment of the invention. Other operational aspects of switches 12 and 14, such as those that are conventional, are not described herein, as they are well understood by persons skilled in the art. Except as otherwise stated, switches 12 and 14 operate not only in the manner described above but also in the manner of a conventional network switch and thus can include any operational aspects or features commonly included in conventional switches.

Figure 4:
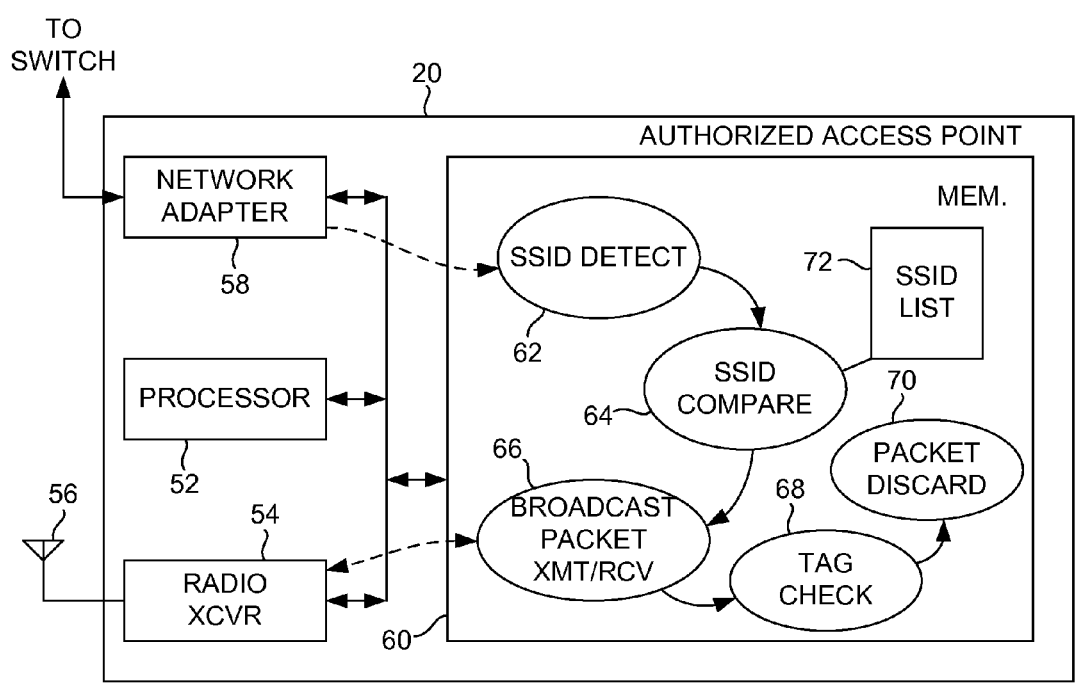
FIG. 4 is a block diagram of the access point of FIG. 1.

As illustrated in FIG. 4, first AP 20 (and any other authorized AP in the network) can include a processor 52, a radio transceiver 54, an antenna 56, a network adapter 58, and a memory 60. In addition to these elements, first AP 20 can include any other suitable elements commonly included in conventional APs. However, as the above-referenced elements are most directly related to the operation of the exemplary embodiment of the invention, only these elements are shown and described herein for purposes of clarity. Conventional elements, including some conventional logic, of first AP 20 are not shown or described herein, as they are well understood by persons skilled in the art. As well understood in the art, first AP 20 can wirelessly communicate with other APs and with WLAN-enabled client devices (not shown) via antenna 56 and radio transceiver 54 in accordance with IEEE 802.11 or similar WLAN standards. First AP can communicate with switch 12 via network adapter 58.

First AP 20 includes the following logic elements: SSID detection logic 62, SSID comparison logic 64, broadcast packet transmit and receive logic 66, tag check logic 68, and packet discard logic 70. First AP 20 also includes a list 72 of authorized SSIDs in the wireless network. Although the logic elements are shown in FIG. 4 in a conceptual manner as stored in or residing in memory 60, person skilled in the art understand that such logic elements arise through the operation of processor 52 under control of software, firmware or other logic and may not be present simultaneously or in their entireties in memory 60. Such software or firmware can be stored or otherwise embodied in any suitable non-transitory medium, including any suitable type of memory, and operated upon in memory 60 or other storage in accordance with well-known computing principles. Such software or firmware can be loaded into memory 60 or other memory (not shown) in any suitable manner, such as during a configuration procedure initiated by host 18 (FIG. 1). The curved arrows in FIG. 4 conceptually represent some of the communication of information that occurs among some of the logic and other elements of first AP 20.

It should be understood that the combination of memory 60 and the above-referenced logic elements or software, firmware, instructions, etc., underlying the logic elements, as stored in memory 60 in non-transitory computer-readable form, defines a "computer program product" as that term is understood in the patent lexicon. In view of the descriptions herein, persons skilled in the art will readily be capable of providing suitable software or firmware or otherwise configuring first AP 20 to operate in the manner described. Also, although the effect of each of the above-referenced logic elements is described herein, it should be understood that the effect may result from contributions of two or more logic elements, or from contributions of the logic elements and conventional AP logic elements or other AP features that are not shown for purposes of clarity.

Broadcast packet transmit and receive logic 66 contributes to the configuring of first AP 20 to wirelessly transmit a layer-2 broadcast packet in the manner described above with regard to FIG. 2. SSID detection logic 62 contributes to the configuring of first AP 20 to detect an identifier transmitted by another access point, such as second AP 24, in the manner described above with regard to FIG. 2. Note that in the exemplary embodiment first AP 20 is configured to not transmit the broadcast packet unless it detects an SSID transmitted by another AP, such as second AP 24.

SSID comparison logic 64 contributes to the configuring of first AP 20 to compare a detected SSID with a list of authorized SSIDs and determine whether the detected SSID is an authorized SSID, in the manner described above with regard to FIG. 2. List 72 includes all authorized SSIDs in the network. Note that in the exemplary embodiment first AP 20 is configured to not transmit the broadcast packet if it determines the detected SSID is an authorized identifier.

Broadcast packet transmit and receive logic 66 also contributes to the configuring of first AP 20 to wirelessly receive broadcast packets of the type described above. Tag check logic 68 contributes to the configuring of first AP 20 to determine whether a received broadcast packet contains a unique tag of the type described above. Packet discard logic 70 contributes to the configuring of first AP 20 to discard the broadcast packet if it contains the unique tag, as described above with regard to FIG. 2.

Note that because second AP 24 can be conventional in structure and operation, second AP 24 is not shown and described in detail similar to that in which first AP 20 is described above.

Figure 5:
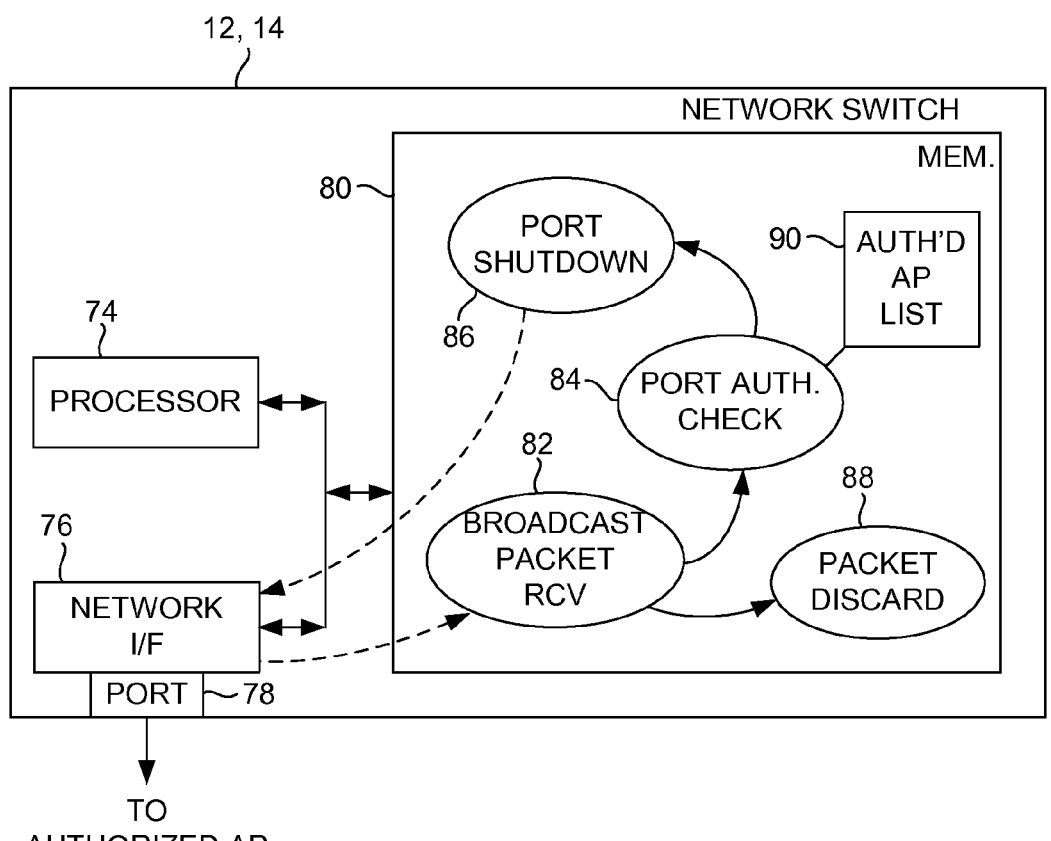
FIG. 5 is a block diagram of the network switch of FIG. 1.

As illustrated in FIG. 5, each of switches 12 and 14 (and any other switch in the network) can include a processor 74, a network interface 76 having a plurality of ports 78, and a memory 80. In addition to these elements, each of switches 12, 14, etc., can include any other suitable elements commonly included in conventional network switches. However, as the above-referenced elements are most directly related to the operation of the exemplary embodiment of the invention, only these elements are shown and described herein for purposes of clarity. Conventional elements of switches 12, 14, etc., including some conventional logic, are not shown or described herein, as they are well understood by persons skilled in the art. Switch 12 can be connected to first AP 20 and network link 16 via ports 78 of network interface 76.

Each of switches 12 and 14 includes the following logic elements: broadcast packet receive logic 82, port authorization check logic 84, port shutdown logic 86, and packet discard logic 88. Each switch 12, 14, etc., in the network also includes a list 90 of its ports with which authorized APs are associated. Although the logic elements are shown in FIG. 5 in a conceptual manner as stored in or residing in memory 80, person skilled in the art understand that such logic elements arise through the operation of processor 74 under control of software, firmware or other logic and may not be present simultaneously or in their entireties in memory 80. Such software or firmware can be stored or otherwise embodied in any suitable non-transitory medium, including any suitable type of memory, and operated upon in memory 80 or other storage in accordance with well-known computing principles. Such software or firmware can be loaded into memory 80 or other memory (not shown) in any suitable manner, such as during a configuration procedure initiated by host 18 (FIG. 1). The curved arrows in FIG. 5 conceptually represent some of the communication of information that occurs among some of the logic and other elements.

It should be understood that the combination of memory 80 and the above-referenced logic elements or software, firmware, instructions, etc., underlying the logic elements, as stored in memory 80 in non-transitory computer-readable form, defines a "computer program product" as that term is understood in the patent lexicon. In view of the descriptions herein, persons skilled in the art will readily be capable of providing suitable software or firmware or otherwise configuring each switch 12, 14, etc., to operate in the manner described. Also, although the effect of each of the above-referenced logic elements is described herein, it should be understood that the effect may result from contributions of two or more logic elements, or from contributions of logic elements and conventional switch features that are not shown for purposes of clarity.

Broadcast packet receive logic 82 contributes to the configuring of switch 12, 14, etc., to receive a forwarded copy of a broadcast packet from an AP, such as second AP 24, in the manner described above with regard to FIG. 3. Note that in the exemplary embodiment switch 14 can receive such a forwarded copy of a broadcast packet from second AP 24 via communication link 26 (FIG. 1). Communication link 26 is connected to a port 78 of switch 14.

Port authorization check logic 84 contributes to the configuring of switch 12, 14, etc., to determine whether the port 78 on which the copy of the broadcast packet was received is associated with an authorized AP. List 90 can be used to look up whether the port on which the copy of the broadcast packet was received is associated with an authorized AP.

Port shutdown logic 86 contributes to the configuring of switch 12, 14, etc., to shut down the port 78 on which the copy of the broadcast packet was received if it is determined that that port 78 is not associated with an authorized AP. Packet discard logic 88 contributes to the configuring of switch 12, 14, etc., to discard the forwarded copy of the broadcast packet received on that port 78.

One or more illustrative or exemplary embodiments of the invention have been described above. However, it is to be understood that the invention is defined by the appended claims and is not limited to the specific embodiments described.

What is claimed is:

1. A method for disabling an access point in a wireless local-area network, comprising:
    a first access point originating a broadcast packet containing a unique tag independently of operation of any network devices in wired communication with the first access point and wirelessly transmitting the broadcast packet;
    a network switch receiving a forwarded copy of the broadcast packet from a second access point connected via a wired connection to a port of the network switch;
    the network switch determining in response to receipt of the forwarded copy of the broadcast packet whether the port is an authorized access point port; and
    the network switch shutting down the port if the network switch determines the port is not an authorized access point port.

2. The method of claim 1, further comprising:
    the first access point monitoring for detection of an identifier transmitted by the second access point;
    wherein the first access point is triggered to originate and wirelessly transmit the broadcast packet in response to detection of the identifier transmitted by the second access point.

3. The method of claim 2, further comprising:
    the first access point comparing a detected identifier transmitted by the second access point with a list of authorized identifiers; and
    the first access point determining whether the detected identifier is an authorized identifier;
    wherein the first access point is triggered to originate and wirelessly transmit the broadcast packet by determining that the identifier transmitted by the second access point is not an authorized identifier.

4. The method of claim 1, further comprising the network switch discarding the forwarded copy of the broadcast packet.

5. The method of claim 1, further comprising:
    the first access point wirelessly receiving another broadcast packet;
    the first access point determining whether the another broadcast packet contains the tag; and
    the first access point discarding the another broadcast packet if the another broadcast packet is determined to contain the tag.

6. A system for disabling an access point in a wireless local-area network, comprising:
    a first access point configured to originate a broadcast packet containing a unique tag independently of operation of any network devices in wired communication with the first access point and wirelessly transmit the broadcast packet; and
    a network switch configured to receive a forwarded copy of the broadcast packet from a second access point connected via a wired connection to a port of the network switch, the network switch further configured to determine in response to receipt of the forwarded copy of the broadcast packet whether the port is an authorized access point port and to shut down the port if the network switch determines the port is not an authorized access point port.

7. The system of claim 6, wherein:
    the first access point is further configured to monitor for detection of an identifier transmitted by the second access point; and
    the first access point is further configured to be triggered to originate and wirelessly transmit the broadcast packet in response to detection of the identifier transmitted by the second access point.

8. The system of claim 6, further comprising:
the first access point comparing a detected identifier transmitted by the second access point with a list of authorized identifiers; and
the first access point determining whether the detected identifier is an authorized identifier;
wherein the first access point is triggered to originate and wirelessly transmit the broadcast packet by determining that the identifier transmitted by the second access point is not an authorized identifier.

9. The system of claim 6, wherein the network switch is further configured to discard the forwarded copy of the broadcast packet.

10. The system of claim 6, wherein:
the first access point is further configured to wirelessly receive another broadcast packet;
the first access point is further configured to determine whether the another broadcast packet contains the tag; and
the first access point is further configured to discard the another broadcast packet if the another broadcast packet is determined to contain the tag.

11. A computer program product for disabling an access point in a wireless local-area network, the computer program product comprising computer-readable media having stored thereon in non-transitory computer-readable form:
broadcast packet transmit logic for configuring a first access point to originate a broadcast packet containing a unique tag independently of operation of any network devices in wired communication with the first access point and wirelessly transmit the broadcast packet;
broadcast packet receive logic for configuring a network switch to receive a forwarded copy of the broadcast packet from a second access point connected via a wired connection to a port of the network switch;
port authorization check logic for configuring the network switch to determine in response to receipt of the forwarded copy of the broadcast packet whether the port is an authorized access point port; and
port shutdown logic for configuring the network switch to shut down the port if the network switch determines the port is not an authorized access point port.

12. The computer program product of claim 11, further comprising:
identifier detection logic for configuring the first access point to monitor for detection of an identifier transmitted by the second access point;
wherein the broadcast packet transmit configures the first access point to be triggered to originate and wirelessly transmit the broadcast packet in response to detection of the identifier transmitted by the second access point.

13. The computer program product of claim 12, further comprising:
identifier comparison logic for configuring the first access point to compare a detected identifier transmitted by the second access point with a list of authorized identifiers and determine whether the detected identifier is an authorized identifier;
wherein the broadcast packet transmit configures the first access point to be triggered to originate and wirelessly transmit the broadcast packet by determining that the identifier transmitted by the second access point is not an authorized identifier.

14. The computer program product of claim 11, further comprising packet discard logic for configuring the network switch to discard the forwarded copy of the broadcast packet.

15. The computer program product of claim 11, further comprising
broadcast packet receive logic for configuring the first access point to wirelessly receive another broadcast packet;
tag check logic for configuring the first access point to determine whether the another broadcast packet contains the tag; and
packet discard logic for configuring the first access point to discard the another broadcast packet if the another broadcast packet is determined to contain the tag.

* * * * *